3,436,546
LASER BEAM DEFLECTOR

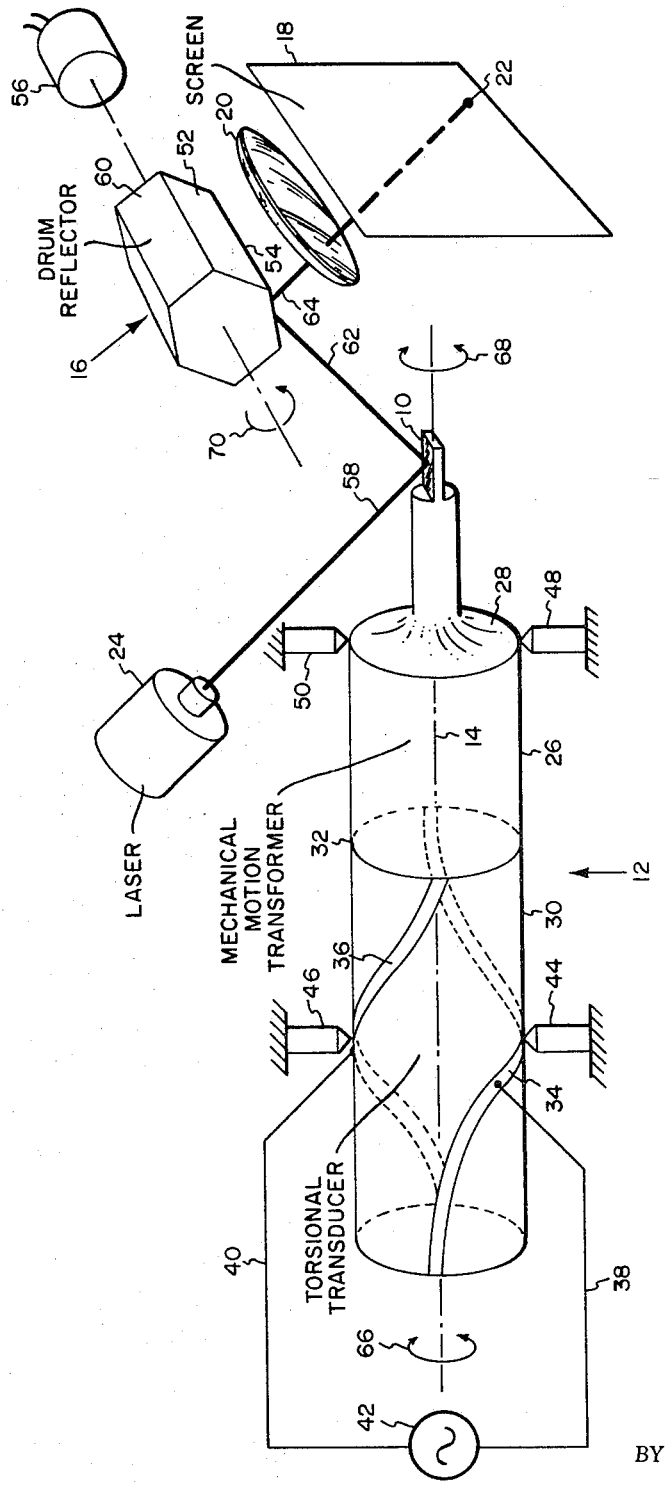

George Derderian, South Seaford, and Robert J. Klaiber, Belrose, N.Y., assignors to the United States of America as represented by the Secretary of the Navy
Filed Oct. 13, 1966, Ser. No. 587,382
Int. Cl. H04b 9/00; H04n 3/08; G02b 17/00
U.S. Cl. 250—199                5 Claims

ABSTRACT OF THE DISCLOSURE

This invention relates to an improved flying spot type scanner providing sufficient beam deflection for use in projection devices requiring relatively large angles and ultrasonic speed and incorporates a piezoelectric drive horizontal scan laser beam deflection means including a mechanical motion amplitude transformer fixed to one end of a torsionally resonant piezoelectric transducer together with a rotatable vertical scan laser beam deflector and automatic indexing means positioned to receive the laser beam from said horizontal scan deflector and redirect said beam in two-dimensional scan.

---

Conventional flying spot scanners include the cathode ray tube (CRT) type with magnetic beam deflection means and scanners of the type using motor driven mirrors to deflect laser beams. The CRT type scanner has the disadvantage of low spot intensity and large spot size. The scanner of the type employing a laser beam and motor driven mirror means for deflecting the laser beam in scanning is limited by mechanical inertia characteristics to audio frequency range.

It is an object of the subject invention to provide an improved flying spot scanner utilizing a laser beam and piezoelectric driven means for deflecting the beam to provide a scanner of maximum spot intensity and scanning speeds in the ultra sonic range.

A further object is to provide a flying scanner having characteristics of high radiance, coherence and collimation in combination of scanning speeds in the ultra sonic range.

Summary of the invention

In general the invention comprises the combination of piezoelectric element torsionally driving a mechanical amplitude transformer of the stepped type having a mirrored end portion to receive and deflect a laser beam producing a horizontal scan, a separate relatively slowly driven mirrored means for producing vertical deflection of said beam and a spot forming lens for receiving said deflected beam to pass the same as a scanning spot on a screen.

Other objects and advantages will appear from the following description of an example of the invention, and the novel features will be particularly pointed out in the appended claims.

In the drawing the single figure is a schematic view of a flying spot scanner incorporating the invention.

Referring to the drawing the scanner shown includes a horizontal scan mirror 10 and drive means indicated generally at 12 for oscillating mirror 10 through an angle in the area of 10° about an axis indicated by line 14 and at a rate of 15,750 cycles per second and higher in the ultra sonic range, a vertical scan mirror and indexing means indicated generally at 16 for progressively scanning a screen indicated at 18 from top to bottom and rapidly indexing back to the top of the screen, a spot forming or focussing lens 20 for forming a scanning spot indicated at 22 on the screen 18, and a laser beam generator 24 for directing a laser beam on the mirror 10.

More particularly, as shown in the drawing, the drive means 12 for the horizontal scan mirror 10 comprises a metallic amplitude mechanical motion transformer 26 of the stepped type with fillet as indicated at 28 and a torsionally resonant piezoelectric ceramic transducer 30 cemented or otherwise fixed as at 32 to the transformer 26 to drive the latter responsive to an oscillating voltage applied to the transducer 30. The transducer 30 is preferably of elongated shape, one-half wave length long with double pitch spiral electrodes 34 and 36 which are connected by electrical leads 38 and 40 to a source 42 of oscillating voltage in the range of 15,750 cycles per second and higher. The transducer 30 is preferably formed of lead zirconate-lead titanate piezoelectric ceramic and is mechanically supported on supports 44 and 46 located at the amplitude node of the transducer 30. The stepped mechanical motion transformer 26 (also commonly called a metal horn) is preferably made of aluminum, the larger cross section portion and the smaller cross section portion being each of approximately one quarter wave length in length. The transformer 26 is mounted in supports 48 and 50, located at the amplitude node of the transformer 26. The mirror 10 can be attached to the face end of the transformer 26 as a passenger or it can be machined into the transformer tip as indicated in the drawing.

In operation of the drive means 12 for the horizontal scanning mirror 10 the transformer 26 is oscillated torsionally at resonance in response to an oscillating voltage input applied to the transducer 30 from the oscillating voltage source 42. Angular momentum is conserved and the mirror 10 is constrained to oscillate through much larger angles (in the area of 10 degrees or more) than the angular oscillation of the transducer 30.

The vertical scan mirror and indexing means 16 is operated at a much lower frequency and is provided to impart vertical deflection to the spot 22 from the top of the screen 18 to the bottom thereof and then indexed rapidly back to the top of the screen.

In the preferred embodiment of the invention shown in the drawing, the mirror and indexing means 16 comprises a multi-sided rotatably mounted drum type reflector 52, each side being of mirrored surface and rotatable into a position as indicated by the position of side 54 to reflect a laser beam from the mirror 10 to the screen 18, together with a constant speed drive means as for example synchronous motor 56 for rotating the reflector 52. The synchronous motor drive is selected to provide 30 mirror indices per second and higher.

In operation of the vertical scan means 16 a laser beam from mirror 10 is reflected from the mirror surface 54 and horizontally scans the screen 18. As the drum reflector 52 is rotated the horizontal scan is vertically deflected from the top to bottom of the screen 18 until the next adjacent mirrored surface comes into position to reflect the beam. At such point the beam is redirected to the top of the screen and the cycle is repeated.

The originating laser beam indicated at 58 is generated by the laser beam generator 24 positioned to direct the beam 58 to the mirror 10. The axis of rotation 60 of the drum reflector 52 is selected in position to receive reflected beam 62 from the mirror 10 and direct reflected beam 64 to horizontal scan on the screen 18. The reflected laser beam 64 two dimensionally scans the low F number focussing lens 20 which forms the spot 22 traversing the screen 18 in the manner of television scanning.

Advantages of the subject invention includes maximum spot intensity and scanning speeds in the ultra sonic range, as well as the combined characteristics of high radiance, coherence and collimation. Further advantage resides in the simplicity and reliability resulting from the combination and arrangement of elements.

Arrow 66 indicates the direction of oscillation of the ends of the piezoelectric transducer 30 operating in torsional oscillation responsive to energization of the transducer. Arrow 68 indicates the torsional oscillation of the face mirrored end of the transformer 26 responsive to drive from the transducer 30, and arrow 70 indicates the direction of drive of the reflection drum 52.

It will be understood that various changes in the details, materials, and arrangement of parts, which have been herein described and illustrated in order to explain the nature of the invention, may be made by those skilled in the art within the principle and scope of the invention as expressed in the appended claims.

We claim:
1. A laser beam type scanner comprising:
    (a) a piezoelectric drive horizontal scan laser beam deflection means for providing deflection and angular oscillation of a laser beam in an ultra sonic range of oscillation responsive to a source of oscillating electric current connected to said means;
    (b) laser beam generator means for directing a laser beam on said deflection means,
    (c) a viewing screen,
    (d) a spot forming lens,
    (e) a rotatable vertical scan laser beam deflector and automatic indexing means positioned to receive the laser beam from said horizontal scan deflector and redirect said beam in two dimensional scan of said lens to provide a flying spot scan of said screen,
    said horizontal scan deflector means including
    (f) a metal mechanical motion amplitude transformer of the stepped type having a flat mirror surface at one face end thereof,
    (g) a torsionally resonant piezoelectric ceramic transducer fixed to the other end of said transformer and provided with spaced electrodes for connection to a source of oscillating voltage of ultra sonic frequency range, and
    (k) support means for supporting said transducer and transformer each at its amplitude node.

2. A laser beam type scanner according to claim 1, said vertical scan deflector means comprising
    (a) a drum reflector having a plurality of angularly disposed consecutively arranged beam deflection elements,
    (b) said drum having a central axis of rotation positioned to direct said beam through said lens to said screen, and
    (c) synchronous drive means connected to said drum to rotate the same at selected speed.

3. A laser beam type scanner according to claim 2,
    (a) said beam deflection elements being planar reflecting surfaces.

4. A laser beam type scanner according to claim 2,
    (a) said transformer and transducer being each of about ½ wave length.

5. A laser beam type scanner according to claim 1,
    (a) said transducer being cylindrical in shape, and
    (b) said electrodes being double pitch spirals on the exterior surface of said cylindrical transducer.

References Cited
UNITED STATES PATENTS

| | | | |
|---|---|---|---|
| 2,971,054 | 2/1961 | Holt | 178—7.6 |
| 3,256,388 | 6/1966 | Miller | 250—199 |
| 2,090,853 | 8/1937 | Priess | 178—7.6 |

OTHER REFERENCES

Texas Instrument Bulletin No. DLA 1324, Experimental Laser Display for Large Screen Presentation, January 1966.

ROBERT L. GRIFFIN, *Primary Examiner.*

A. J. MAYER, *Assistant Examiner.*

U.S. Cl. X.R.
178—7.6; 350—6, 7